United States Patent [19]

Gray

[11] 4,137,983
[45] Feb. 6, 1979

[54] SECTIONALIZED PANEL CLOSURE

[75] Inventor: William E. Gray, Oswego, Ill.

[73] Assignee: Caterpillar Tractor Co., Peoria, Ill.

[21] Appl. No.: 814,596

[22] Filed: Jul. 11, 1977

[51] Int. Cl.² .................. B62D 25/10; B62D 27/06
[52] U.S. Cl. ................................ 180/69 R; 16/172; 49/463
[58] Field of Search .............. 180/69 R, 69 C, 64 R, 180/68.5; 296/28 R; 52/453, 488; 49/463, 464; 220/343, 342, 340, 327; 16/128.1, 172, 148

[56] References Cited

U.S. PATENT DOCUMENTS

| 1,598,868 | 9/1926 | Lundelius | 16/128.1 |
| 2,570,992 | 10/1951 | Thomas | 16/172 |
| 2,652,171 | 9/1953 | Johnson | 220/327 |
| 3,211,494 | 10/1965 | Husko | 16/128.1 |
| 3,860,083 | 1/1975 | Yancey | 180/69 R |
| 3,937,352 | 2/1976 | Kalous | 220/327 |

FOREIGN PATENT DOCUMENTS 470399  9/1914  France ........................... 220/343

Primary Examiner—David M. Mitchell
Attorney, Agent, or Firm—Sixbey, Bradford & Leedom

[57] ABSTRACT

A sectionalized panel closure for a top access opening into a compartment, such as for an engine compartment in a hood enclosure assembly, including a plurality of separate panel sections superimposedly mounted over the access opening in a manner to be individually selectively moved and/or removed, to provide access into portions of the engine compartment, means being provided intermediate adjacent panels whereby some panels can be rotatably folded back over adjacent panels or, similar to other panels in the assembly, can be completely vertically removed, the panel sections being of size and weight permitting easy manipulation or removal for engine compartment access, and securing means are provided on each corner of the sections.

18 Claims, 9 Drawing Figures

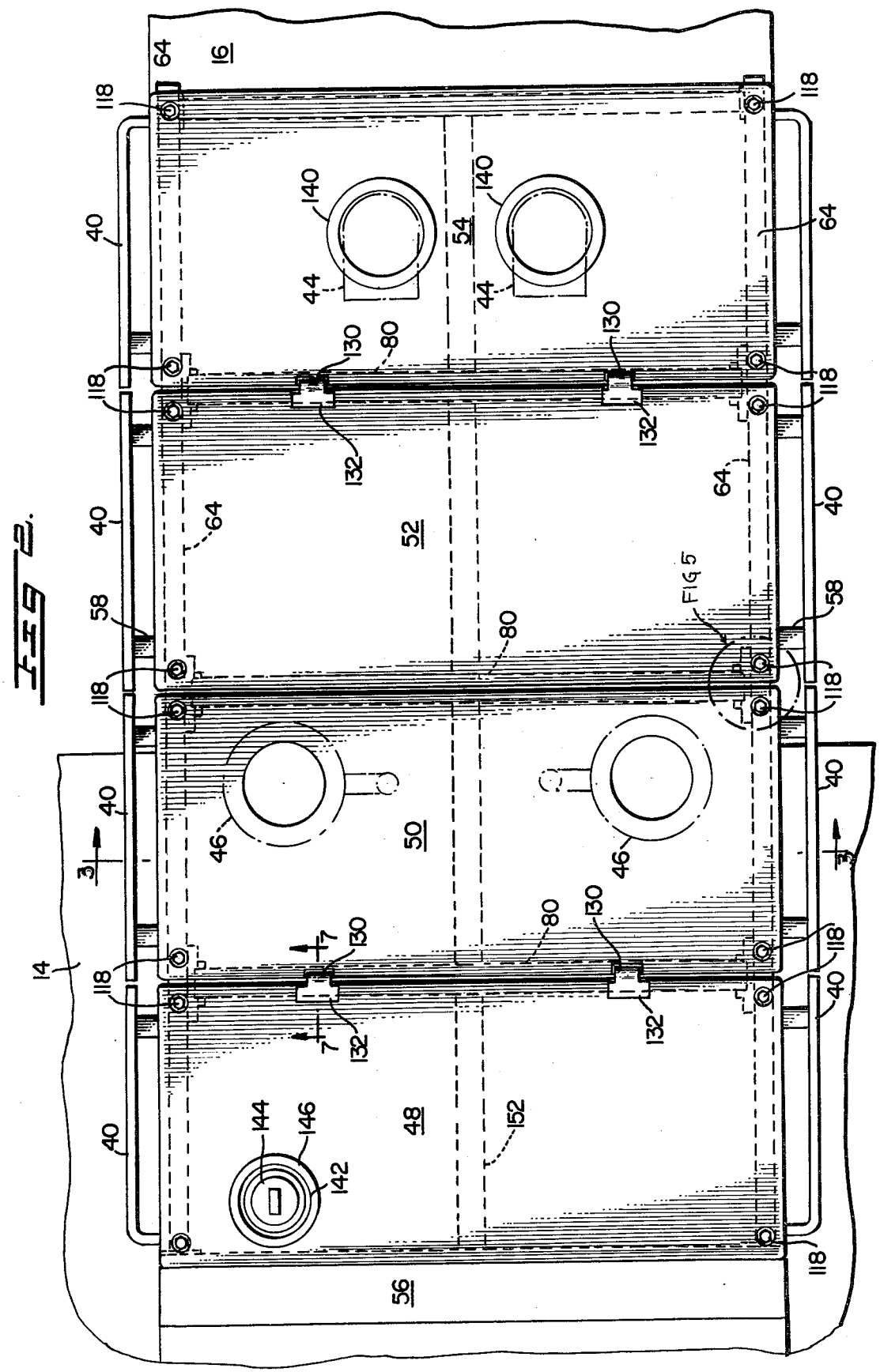

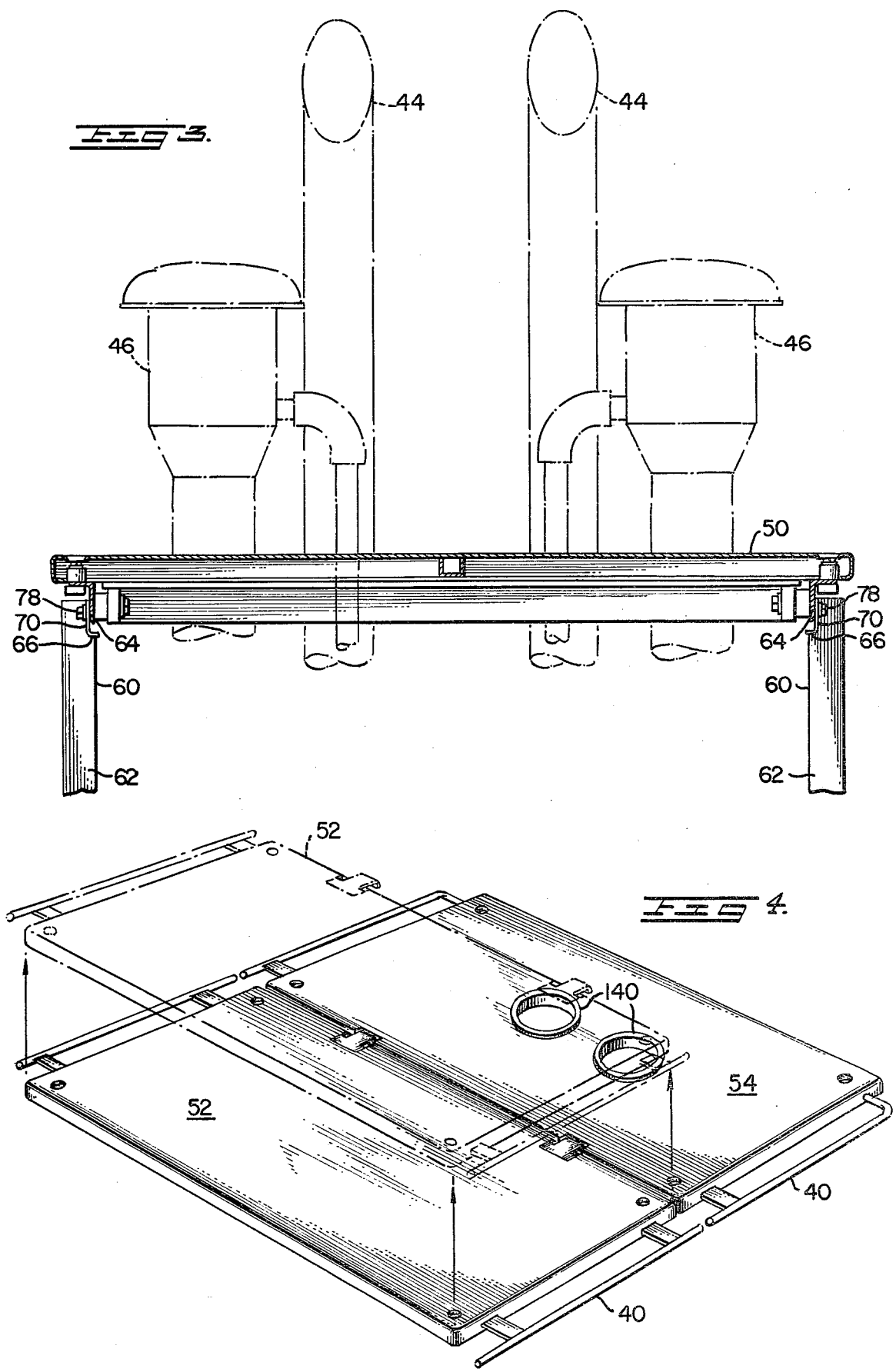

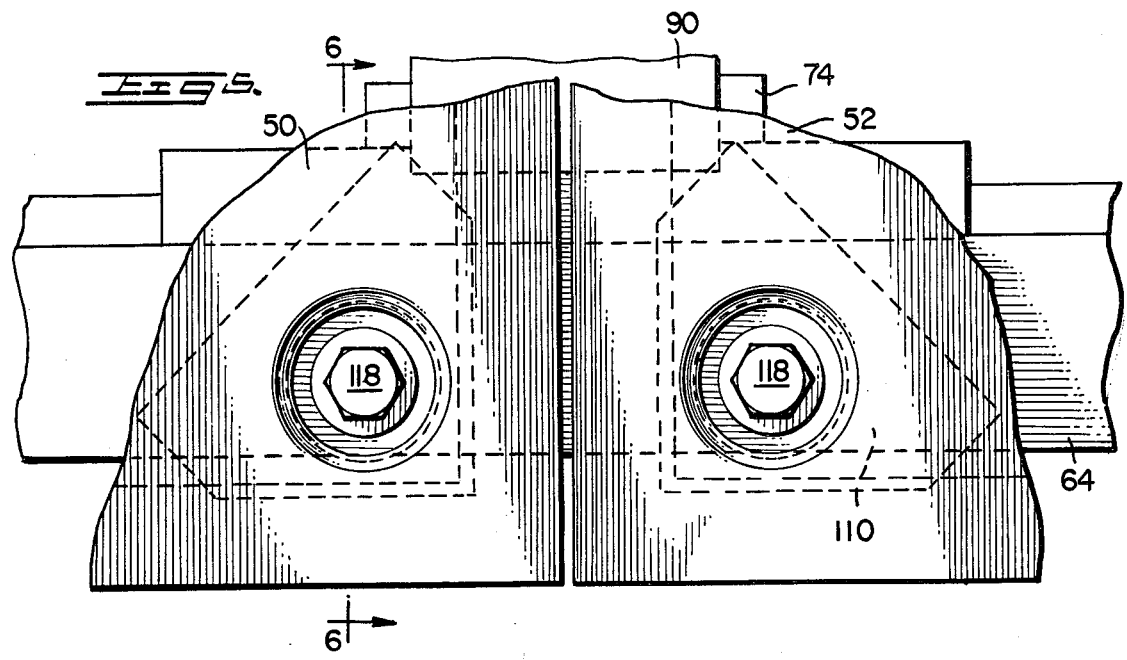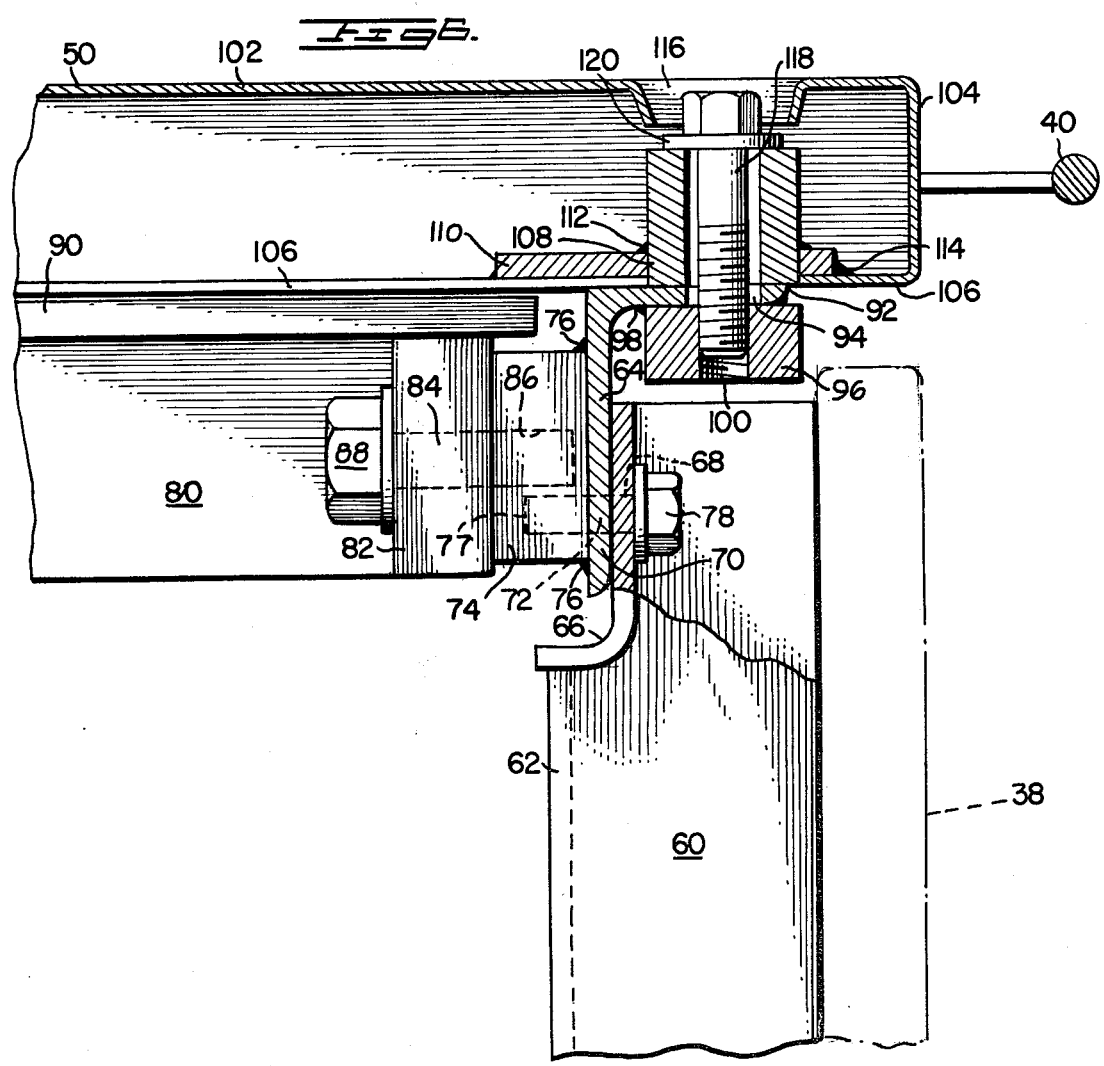

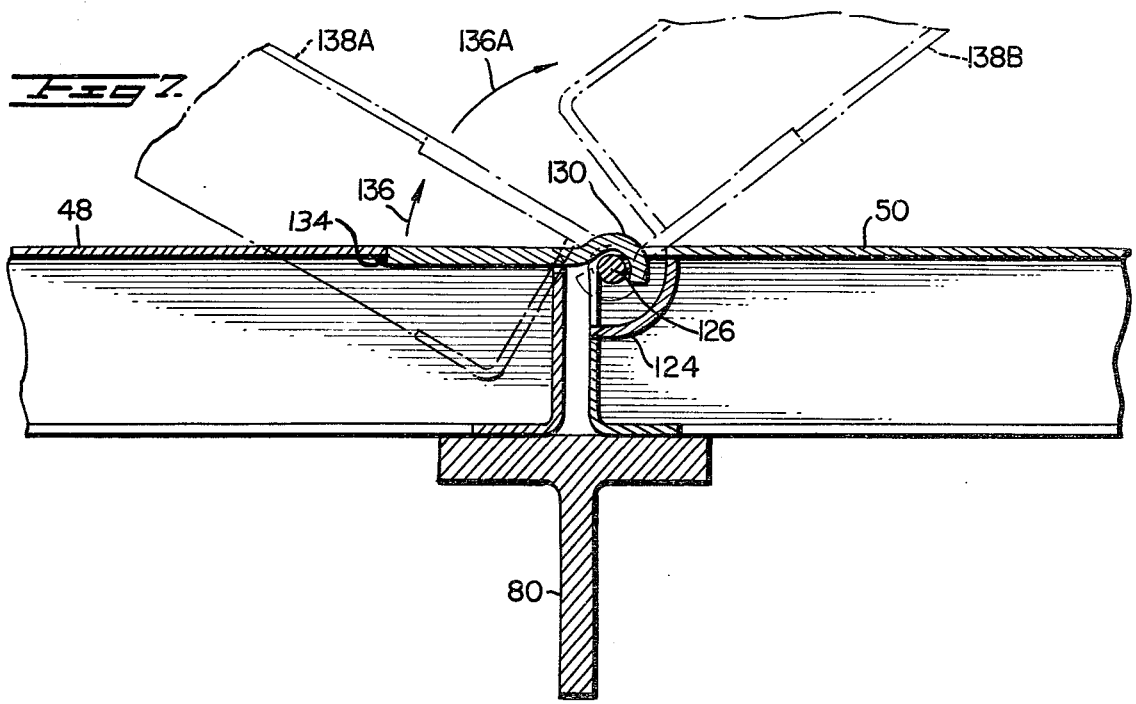
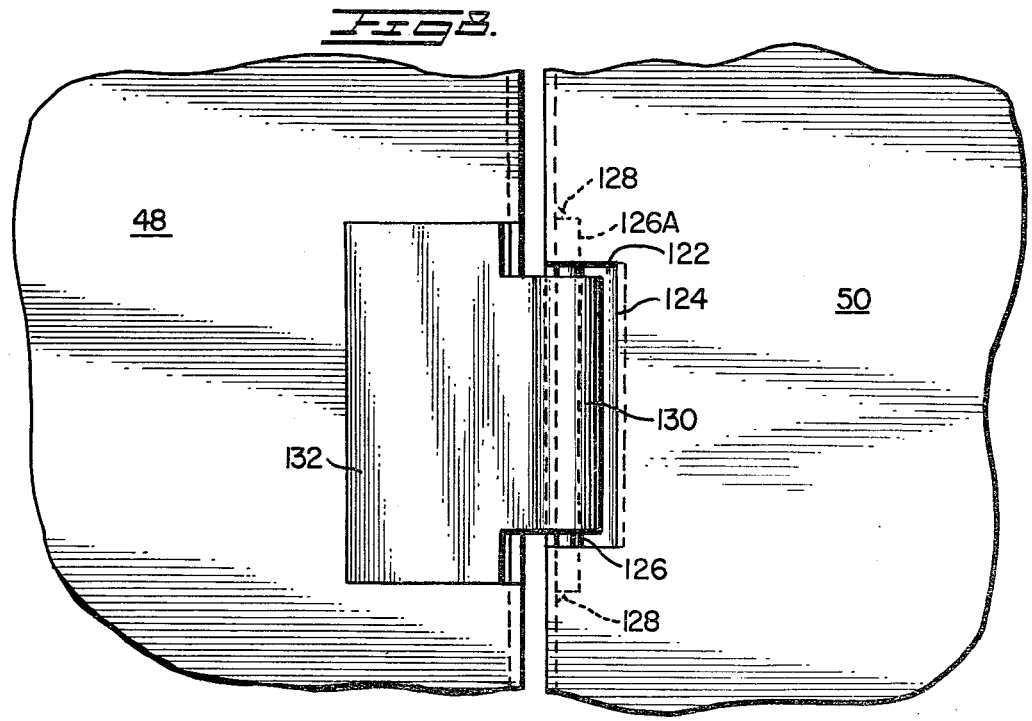
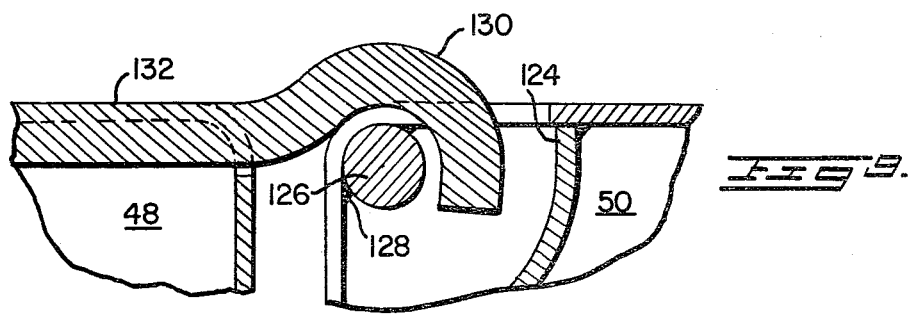

SECTIONALIZED PANEL CLOSURE

BACKGROUND OF THE INVENTION

This invention relates broadly to panel sections in a hood enclosure assembly, such as in an engine compartment of a wheeled vehicle, and more specifically to such panel sections which are so positioned over a top access opening to an engine compartment, adjacent one another, as to selectively close the entire access opening, or which can be manipulated so as to pivot or fold certain ones of said panel sections rotatably back over adjacent ones, or the individual panel sections can be wholly removable separately, without totally disassembling the assembly, to provide access to selected areas of the compartment.

Basically the access opening can be in any type of enclosure but the particular problems sought to be overcome or resolved by the present invention are those which reside in access opening closures for vehicle engines, such as in a hood enclosure assembly on equipment in the nature of earth working, construction, or heavy duty vehicles including but not limited to wheeled earth movers, earth graders, bulldozers, and the like.

As is known, in such types of construction, earth working, etc. vehicles, including, but certainly not limited to wheeled front end loaders, wheel loaders generally, wheel dozers, wheel compactors, sanitary land fill compactors and the like, the engines normally are of a substantial size, requiring large size engine enclosures and working and environment conditions lead to dust, dirt etc. entering the engine compartment or enclosure, with a possibility of affecting operation thereof, and possibly causing substantial deterioration over a period of time, unless the engines are appropriately cared for, and appropriately structurally and functionally maintained. Access to these engines is additionally necessary for repairs upon breakdown or the like.

Many engine compartments have access openings in the sides thereof, and additionally on the top of the hood enclosure assembly, with access to the engine within the engine compartment being as optimal as possible.

Structures such as panels for selectively closing or opening top access openings into engine compartments have heretofore at times been of a size to cover the entire access opening as a single entity. Such constructions manifestly were bulky, cumbersome, hard to handle, heavy, and otherwise of undesirable structure, and entailed difficult manipulation, especially by single service men or personnel, particularly in field operation service. Such structure obviously left much to be desired.

It is a primary object of the present invention to provide, in a hood enclosure assembly, an access closure means which is readily manipulable to selectively and controllably provide desired access into the engine compartment, and the construction is such that individual portions can be separately removed in order to decrease weight problems and/or size problems. The overall sought end result is a simplification in structure, functioning and operation.

DESCRIPTION OF THE PRIOR ART

Heretofor, particularly with reference to hood enclosure assemblies or engine enclosure assemblies in wheeled vehicles of the earth moving, construction, etc. type, enclosure panels mounted on top opening engine compartments were provided, but such panels were in some instances of a substantial size and weight such that removal, either in part or in toto, was not only difficult but in some field type operations virtually impossible.

Panels of the type with which the present invention is concerned have not only been heavy, difficult for personnel to manage, and expensive, but have lacked strength in light weight substitute panels for example, and securement means were not operably adequate to permit ready removal of portions or sections, without removing an entire panel, with accompanying drawbacks.

Heretofore known structures of the type in question, which might have been sectionalized, were lacking in efficient securement, or positioning means, and modifications accordingly are desirable to overcome these drawbacks, and permit ready and rapid securement at multiple positions on the panel sections, or overall panel portions.

The assignee company of the inventors has for a long period of time been in the field of design, manufacture, sale and maintenance of heavy equipment of earth working or construction types, and the problem of wholly satisfactory closures for access openings to engine compartments has been in existence for a long period of time. The company, while having been aware of existing constructions, has for a long period of time desired an innovation or change from the old style operations, such as the use of extensive size and weight panels mounted on top opening access openings, in order to overcome difficulties and drawbacks encountered thereby.

SUMMARY OF THE INVENTION

The present invention accordingly is directed basically to providing, in an engine enclosure compartment having a top access opening, a sectionalized panel closure therefore of a construction which can be easily manipulated by an individual for access to an engine in the compartment, and preferably the access panel includes a plurality of separate panel sections which are so mounted over the top access opening as to be individually selectively moved, or removed, to provide optimum access through the access opening into the top and other areas of the engine compartment.

In accomplishing the desired end result the present invention incorporates into a sectionalized panel closure means to permit some of the individual panels to be rotatably folded back over adjacent ones, or to be vertically removed therefrom without disturbing or disassembling the partial means for such rotational operation on the adjacent panel section, which otherwise remains mounted over the access opening.

The present sectionalized panel closure further includes means for limiting such rotation to an extent whereby one panel section does not completely lie contiguously over and upon the adjacent section about which rotated.

A further feature of the construction resides in the individual panel sections being secured on each corner thereof in an efficient manner, with the securement bolts recessed to provide a smooth external appearance and surface, and to be aesthetically pleasing from the exterior.

A still further feature of the invention is to provide securement means in the nature of corner securing bolts which, upon removal, will permit either rotation or pivotting of a panel section and/or permit the same to be lifted straight out, the pivotting being around a hinge like connection, the adjacent panel section about which one is hinged however being only vertically removable upon removal of the corner securement bolts.

An additional feature is to provide means for rotatably manipulating one panel section with respect to a next or adjacent panel section, with the rotation thereof being possible in only one direction.

The features of the invention result in a structure having ease of operation, optimum working access opening, structural integrity, light weight easily removable sections for single personnel to manipulate, a ready and secure affixing means for each of the sections, aesthetically pleasing appearance, safety, and generally and specifically overcoming known drawbacks in prior art structures. The overall results are a very substantial advance and contribution to the pertinent area of interest.

Additional objects, features and advantages of the invention will be more readily apparent from the following detailed description of an embodiment thereof when taken together with the accompanying drawings in which:

FIG. 2 is a top plan view of the structure of the present invention, shown mounted on a fragmentarily shown portion of the vehicle of FIG. 1;

FIG. 3 is a fragmentary, transverse vertical sectional view, taken along line 3—3 of FIG. 2;

FIG. 4 is a perspective view of a mated pair of cover or hood panel sections, and showing, in exploded relation in phantom lines, a lifted hood panel section;

FIG. 5 is an enlarged fragmentary view of two adjacent panel corners, indicated by the broken line circle in FIG. 2;

FIG. 6 is a detailed fragmentary sectional view, taken on line 6—6 of FIG. 5;

FIG. 7 is an enlarged fragmentary transverse sectional view, taken along line 7—7 of FIG. 2;

FIG. 8 is a top plan view of the structure of FIG. 7; and

FIG. 9 is an enlarged fragmentary detailed view of the cradle hook shown in FIG. 7.

DETAILED DESCRIPTION

Figure 1:
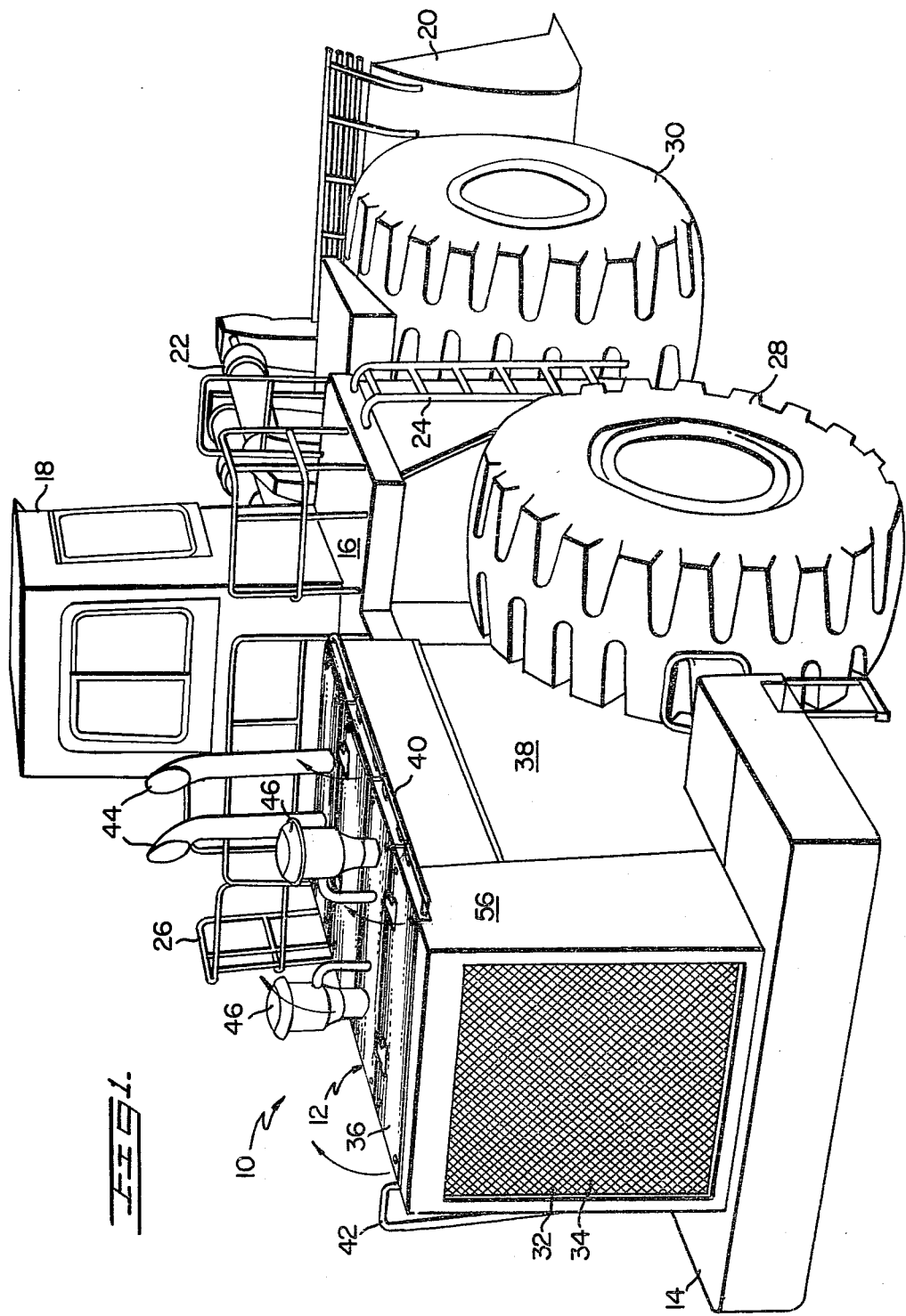
FIG. 1 is a perspective view of a front end loader incorporating the invention.

Referring now in detail to the drawings, there is shown in FIG. 1, and generally designated 10, a wheeled or front end loader which includes an engine compartment or hood enclosure assembly 12, a bumper 14, an operator's platform 16, an operator's cab 18, a bucket 20 of a generally known type operable through a hydraulic piston and cylinder means generally shown at 22, an access ladder to the operator's platform designated 24, and guard or hand rails 26. The vehicle is, as per usual, equipped with wheel and tire units 28 and 30. All of the foregoing is of a usual structure in a field in which the assignee of this application and the present inventors have been occupied over a substantial period of time.

The present invention as hereinbefore pointed out is directed broadly to access means to the top of an engine compartment of an engine enclosure assembly. The engine enclosure assembly 12 includes, as seen in FIG. 1, a radiator 32, with a front perforated grill 34, positioned at the end of the engine compartment. The engine compartment assembly includes the usual top wall 36, generally designated, side walls 38, generally designated, only one of which is shown, horizontal grab irons or handles 40, a vertical grab or handle rail 42. The top wall 36 of the engine enclosure includes openings for mounting exhaust pipes or stacks 44 and filters or the like 46, all in a known usual fashion. Details of the openings permitting mounting of these latter units will be explained in greater detail hereinafter, since incorporating desirable, novel and useful modifications of structures heretofore used.

The top panel of the engine enclosure 36 in the present invention consists of a plurality of separate individual panel sections, designated in a direction starting from the radiator assembly or hood, in the direction of the cab 18, as sections 48, 50, 52, and 54. These individual panel sections are formed from relatively thin sheet metal material. In one operable embodiment the sheet steel or metal has a thickness of 0.075 inches which, as is well known, is comparatively thin and possibly subject to bending, tin canning, susceptible to damage such as denting, etc. The present invention includes means and structure whereby these drawbacks are overcome. The orientation and general mounting or positioning of these individual panel sections will be apparent from a study of FIGS. 1 and 2. A radiator shroud 56 is fragmentarily shown in the top plan view of FIG. 2, as also the relationship of bumper 14 and operator's platform 16. This view also shows the grab irons or handles 40 on either side of the hood enclosure assembly 12. These members are mounted by means of structural members generally indicated at 58.

Support structure for the sectionalized panel closure includes vertical struts or shafts 60, as portions of the vertical frames, and they preferably consist of U-shaped channels, with the connecting web being indicated by the broken lines, and designated generally at 62. A plurality of these are spaced along the longitudinal extent of the hood, and comprise the vertical frame members. Extending between, and connected to all of these vertical frame members 60 are longitudinal frame members or stringers 64, one for each longitudinal side of the compartment, and which are formed of angle irons as shown for example in FIGS. 3 and 6. As shown more clearly in FIG. 6 the upper inner ends of these U-shaped or channel like vertical frame members 60 have the corners cut away, and as shown at 66 saddle reinforcement members are attached thereinto as by welding or the like. These saddle reinforcement members also serve as portions of the mounting and connecting means for the longitudinal or horizontal frame members 64. To this end holes, as shown by broken lines at 68, extend through the vertical leg portions of the saddle reinforcements. The vertical web 70 of the angle iron forming the horizontal frame member 64 is provided with holes shown in dotted lines at 72. Mounting plates 74 are spacedly attached to the inner face of the vertical web 70 by welding as at 76. The horizontal or longitudinal frame members 64 extend the entire length of the engine hood assembly, and the mounting plates 74 are spacedly mounted along the angle iron member for the purpose of mounting the same on the vertical frame members 60, and additionally for mounting of transverse frame members, as will appear hereinafter. The mounting plates 74 have an internally threaded bore 77 in which threaded bolts or cap screws 78 are threadedly engaged. As seen in FIG. 6 this operatively interconnects the vertical frame members 60, horizontal or longitudinal frame members 64, and mounting plates 74.

Spacedly positioned at the points of mounting plates 74, and in positions intermediate adjacent ends of the panel sections, there are T-shaped transverse frame members 80 which have mounting plates 82 affixed to the underside thereof, with holes or openings shown in dash lines at 84. The mounting plate 74 additionally has a threaded bore 86. Threaded bolts 88 are inserted into the hole 84 and bore 86 and coacting therewith serve to interconnect the mounting plate 82 with the mounting plate 74, and serve to interconnect the T-shaped transverse frame members 80 therewith. The head or cross of the transverse frame member is shown at 90, and the entire transverse frame member serves to rigidify the overall frame of the structure.

As also shown in greater detail in FIG. 6, the horizontal web 92 of longitudinal frame member 64 is provided at spaced positions along the run thereof with openings 94, beneath which, and to the underside of the horizontal webs 92 are affixed bars 96 by welding as at 98, and these bars are provided spacedly with threaded bores 100.

The panel sections 48, 50, 52 and 54 which, as pointed out hereinbefore are formed of relatively thin sheet metal, have planar tops as indicated at 102 in FIG. 6, and each edge thereof around the periphery of the sections are downwardly bent to vertical position at 104, and horizontally inwardly at 106, so that the ends or edges are generally of a U-shaped configuration. This in addition to the other structure, as will be detailed hereinafter, lends strength to the invidiual thin walled panel sections.

Superimposed above the holes 94 in the horizontal or longitudinal channels or frame members 64, are centrally apertured spacer bosses 108, which extend through apertured gusset plates 110 and are welded thereto at 112. These gusset plates, as shown in FIG. 5 in broken lines, fit within the corner portions of the panel sections and are welded to the internal surfaces of the inturned edges of the panels as shown at 114. As also shown in FIG. 6, the upper surface or planar tops 102 of the panels are provided in the four corners thereof with apertures 116, which have inwardly and downwardly tapering side walls for safety and stiffening purposes. The stiffening aspect is readily understandable.

For mounting of the individual sections with respect to the longitudinal or horizontal frame members 64, subsequent to placement thereon, threaded bolts 118 are passed through the apertures 116 and extend through spacer bosses 108, with play, a washer 120, hole 94 and threadedly engage in threaded bores 100. The relative dimensions of the aperture in boss 108 and diameter of bolt 118 provides for instances of structural deformation etc. which might occur in the panel sections.

From an inspection of FIG. 2, it will be seen that each corner of each of the panel sections has a bolt extending therethrough, and they are operable to securely attach the corners, and consequently the panel sections to the horizontal frame members 64, and these in turn are securely attached to the T-shaped transverse frame members 80. The result is a very sturdy and strong structural integrity, with the recessing of the bolts below the upper surfaces 102 eliminating extensions or projections beyond this upper surface, which accordingly provides a safety factor, and improved aesthetic qualities to the apparatus.

The tapering side wall apertures at 116 serve to prevent injury to personnel when inserting or removing bolts 118 and panel sections. It is to be noted that the apertured spacer bosses 108 are not attached to the upper surfaces of the horizontal webs 92 of the longitudinal frame members 64, and therefore the individual sections are readily removable, subsequent to removal of the bolts. This is one of the features of the present invention which constitutes a very substantial improvement over previously known structures. The individual panel sections are of a size, weight, configuration and general construction whereby a sole individual or operator can remove and replace these panel sections in order to obtain access into the engine compartment.

An additional and very important feature of the invention resides in what can be termed a half hinge (although not strictly correct) which constitutes means for pivoting or rotating some of the panel sections from the horizontal positions shown in FIGS. 2, 6 and 7, for example, the panel being rotatable over and above a next succeeding adjacent panel. This structure will be explained with reference to FIGS. 7, 8 and 9. Alternate ones of the panel sections, 50 and 54 for example, have openings or recesses in the nature of cutouts 122 in an edge thereof, and in which are secured saddle reinforcement members with inner curved surfaces 124 which serve not only as stiffeners but also as dirt shields. Fulcrum pins 126 are positioned in the recesses 122 below the top surfaces of the panel sections, and the extended ends 126A thereof are welded as at 128. The pins and openings are provided at transversely spaced positions in these panel sections.

The panel sections adjacent to those having the pins, i.e., panel sections 48 and 52, are provided, on the edges thereof adjacent the openings of adjacent panels, with cradle hooks generally designated 130, formed as extensions of plate members 132, welded into a top surface opening or cutout in the upper surface 102, the weld being indicated at 134. These cradle hooks 130 are positioned to coact with the fulcrum pins 126, with the hooked ends passing into and through the cutouts 122, and the hooks being positioned above the pins when the panel sections 48 and 52 are mounted on the transverse and longitudinal frame members as shown in the drawings. It will be noted that the interior of the cradle hook, and the exterior of the fulcrum pins, are spaced apart in this relationship, as shown in full lines in FIG. 7.

An important feature of this invention is the fact that the panel sections 48 and 52 can be rotated, as indicated by arrows 136 and 136A, from a horizontal mounted position to the dotted line positions indicated at 138A and 138B. When the panel section is rotated from the horizontal to the position shown at 138A, the movement being indicated by arrow 136, the inner curved surface of the cradle hook 130 will rest upon the fulcrum pin 126, which then serves as a pivot, until the section reaches the position indicated at 138B. The latter movement is indicated by the arrow 136A, and thereupon the upper corner surface or edge of the curvilinear shaped insert 124 thereupon abuts against the top surface of the panel section, and prevents further rotation. Accordingly it will be seen that rotational movement of the panel sections is limited, and they cannot so rotate as to lie in juxtaposition to their adjacent panel sections.

Since the cradle hook is open at the bottom it is possible to lift the panel sections 48 and 52, for example, vertically upward to disassociate the panel section from the rest of the apparatus. This of course can only be accomplished subsequent to removal of the bolts in the four corners of the units.

The surfaces of the panel sections are provided with protective ring inserts 140 which fit into the openings provided for the exhausts 44, and additionally an opening 142 is provided in the section 48 for access to a radiator cap 144, and again a protective ring insert 146 is used.

In FIGS. 3 and 6, shown in phantom lines, are side panels 148 of a usual type and below which an access panel 150 can be provided, and which could be removable for access into the side of the engine compartment.

Longitudinal stiffeners 152 are provided, extending in each of the sections between the front and rear transverse or cross frame members, this being necessary for structural strength in view of the light weight material constituting the panel sections.

In order for the panels 50 and 54 to be removed, it is first necessary to remove the panels 48 and 52 respectively, subsequent to removal of the fastening and securing bolts in the four corners thereof and, subsequently removal of the bolts in the corners of the panel sections 50 and 54, whereupon these latter panel sections can be vertically removed. The exhausts and air filters are vertically removable in a usual manner.

While the invention has been specifically described as applied to an engine compartment in a hood assembly for wheeled vehicles and the like, the structure is useful for any setting where access to an enclosure is desired.

Manifestly minor changes in details of construction can be effected in the structure, as shown and described, without departing from the spirit and scope of the invention as defined in and limited solely by the appended claims.

What is claimed is:

1. A closure for a top access opening into a compartment comprising a plurality of separate closure sections, mounting means superposedly positioning said sections over said access opening and in adjacent side by side relationship, said sections conjointly covering and closing said access opening, coactive means on contiguous edges of adjacent ones of said sections, said coactive means including a fulcrum pin adjacent an edge of a first said section and a cradle hook on an edge of an adjacent section, said edge adjacent said fulcrum pin having a recess therein, a curvilinear recess facing insert in said recess, said fulcrum pin being within said recess, said insert partly surrounding said fulcrum pin and being radially spaced therefrom, said cradle hook having an underside and including a downwardly opening hooked end thereon, said cradle hook, in a normal mounted position of said adjacent sections, extending over said fulcrum pin, with said hooked end opening toward and spaced from, and partly above, said fulcrum pin, said hooked end being operatively engageable with said fulcrum pin to rotatively pivot said adjacent section over said first said section and upon pivoting of said adjacent section, opening a section of said closure, and providing access into a part of said compartment therebelow.

2. A closure as claimed in claim 1, the top surface of the cradle hook containing section engaging with the upper edge of said curvilinear insert upon rotation through a predetermined angle to thereby prevent a complete superimposition of the rotated section on the adjacent section.

3. A closure as claimed in claim 2, wherein at least two said fulcrum pins and said cradle hooks are spacedly positioned along edges of adjacent sections.

4. A closure as claimed in claim 3, and means operable to selectively separately secure each said section to said mounting means.

5. A closure as claimed in claim 4, each said closure section being vertically movable off of the mounting means therefor, and thereby exposing portions of the compartment therebelow, said sections being vertically movable only subsequent to removal of said securing means for the section.

6. A closure as claimed in claim 5, said separate securing means for each section consisting of bolts inserted in each of four corners of each said section and securing said panels at said four corners to said mounting means.

7. A closure as claimed in claim 6, said sections having said cradle hooks being vertically removable due to said cradle hooks having open bottom portions and said panels having said fulcrum pins being subsequently vertically movable.

8. A closure as claimed in claim 7, said mounting means for said sections including longitudinal frame members and spaced T-shaped transverse frame members, vertical frame members operatively connected to said longitudinal frame members, said transverse frame members being operatively secured to said longitudinal frame members and said vertical frame members, and bolt securing means operatively interconnecting said longitudinal, vertical and transverse frame members.

9. A closure as claimed in claim 8, each said closure section being generally rectangular formed of sheet metal, and having the periphery thereof bent into a substantial U-shape edge for stiffness and strength; said securing means including a gusset plate affixed in each corner of said section on a portion forming the base of the U-shaped edge, bars having threaded bores therethrough attached to the underside of said longitudinal frame members, said longitudinal frame members having openings mating with said bores, apertured spacers affixed within the U-shaped edge with the apertures mating with the openings in the longitudinal frame member and threaded bores in said bars, the upper surface of said section having apertures with inwardly tapering side walls therein, bolts said bolt securing means including inserted through said apertures into engagement with said threaded bores in said bars, subsequent to passage through said apertured spacers, and the heads of said bolts being recessed below the top surface and contained within said tapered side wall apertures, the recessed bolt heads imparting safety and aesthetic appeal to the external upper surfaces of said sections.

10. In a hood closure assembly for a vehicle, an engine compartment mounted on said vehicle, said engine compartment having a top access opening for access to an engine therein, a closure for said access opening including a plurality of separate panel sections constituting partial closure sections for the opening, said sections being mounted around the periphery of said opening on framework of said vehicle, said sections being mounted in adjacent side by side relationship, said sections conjointly covering and closing said access opening, coactive means on contiguous edges of adjacent ones of said sections, said coactive means including a fulcrum pin adjacent an edge of a first said section and a cradle hook on an edge of an adjacent section, said edge adjacent said fulcrum pin having a recess therein, a curvilinear recess facing insert in said recess, said fulcrum pin being within said recess, said insert partly surrounding said fulcrum pin and being radially spaced therefrom, said cradle hook having an underside and including a downwardly opening hooked end thereon, said cradle hook, in a normal mounted position of said adjacent sections, extending over said fulcrum pin, with said hooked end opening toward and spaced from, and partly above, said fulcrum pin, said hooked end being operatively engageable with said fulcrum pin to rotatively pivot said adjacent section over said first said section and upon pivoting of said adjacent section, opening a section of said closure, and providing access into a part of said engine compartment therebelow.

11. A closure as claimed in claim 10, the top surface of the cradle hook containing section engaging with the upper edge of said curvilinear insert upon rotation through a predetermined angle to thereby prevent a complete superimposition of the rotated section on the adjacent section.

12. A closure as claimed in claim 11, wherein at least two said fulcrum pins and said cradle hooks are spacedly positioned along edges of adjacent sections.

13. A closure as claimed in claim 12, and means operable to selectively separately secure each said section to said framework.

14. A closure as claimed in claim 13, each said closure section being vertically movable off of the mounting means therefor, and thereby exposing portions of the compartment there below, said sections being vertically movable only subsequent to removal of said securing means for the section.

15. A closure as claimed in claim 14, said separate securing means for each section consisting of bolts inserted in each of four corners of each said section and securing said panels at said four corners to said mounting means.

16. A closure as claimed in claim 15, said sections having said cradle hooks being vertically removable due to said cradle hooks having open bottom portions, and said panels having said fulcrum pins being subsequently vertically movable.

17. A closure as claimed in claim 16, said framework for said sections including longitudinal frame members and spaced T-shaped transverse frame members, vertical frame members operatively connected to said longitudinal frame members, and said transverse frame members being operatively secured to said longitudinal frame members and said vertical frame members, and bolt securing means operatively interconnecting said longitudinal, vertical and transverse frame members.

18. A closure as claimed in claim 17, each said closure section being generally rectangular formed of sheet metal, and having the periphery thereof bent into a substantial U-shape edge for stiffness and strength; said securing means including a gusset plate affixed in each corner of said section on a portion forming the base of the U-shaped edge, bars having threaded bores therethrough attached to the underside of said longitudinal frame members, said longitudinal frame members having openings mating with said bores, apertured spacers affixed within the U-shaped edge with the apertures mating with the openings in the longitudinal frame member and threaded bores in said bars, the upper surface of said section having apertures with inwardly tapering side walls therein, said bolt securing means including bolts inserted through said apertures into engagement with said threaded bores in said bars, subsequent to passage through said apertured spacers, and the heads of said bolts being recessed below the top surface and contained within said tapered side wall apertures, the recessed bolt heads imparting safety and aesthetic appeal to the external upper surfaces of said sections.

* * * * *